April 28, 1925.
A. J. GULICH
1,535,410
REFRACTORY SHAPE PRESS AND MOLD THEREFOR
Filed March 20, 1924    4 Sheets-Sheet 3
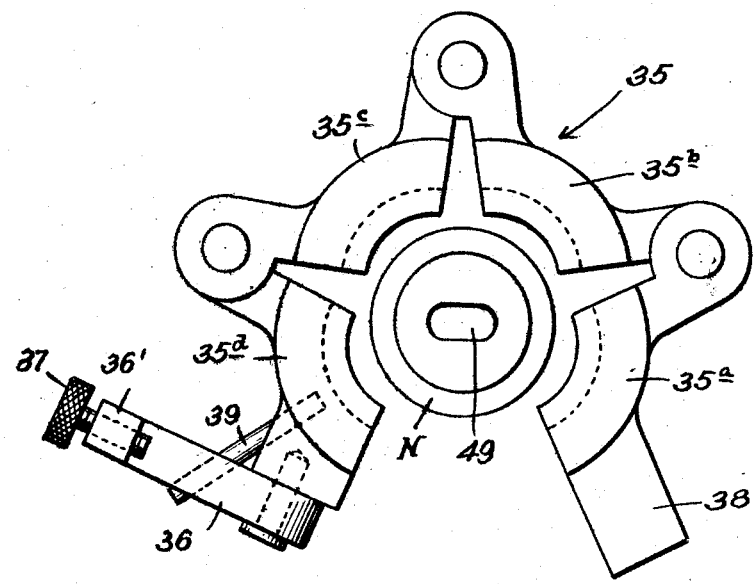
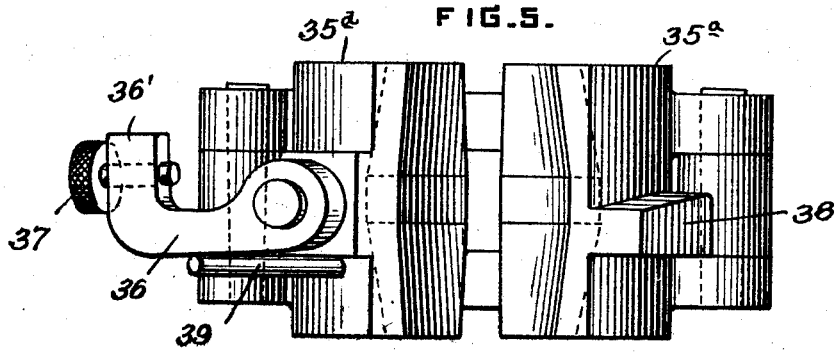
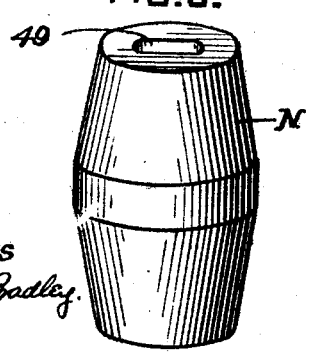
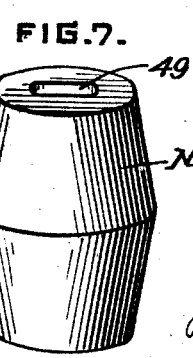
WITNESSES
J. Herbert Bradley
INVENTOR
Ashley J. Gulich
By Winter & Brown
his Attorneys.

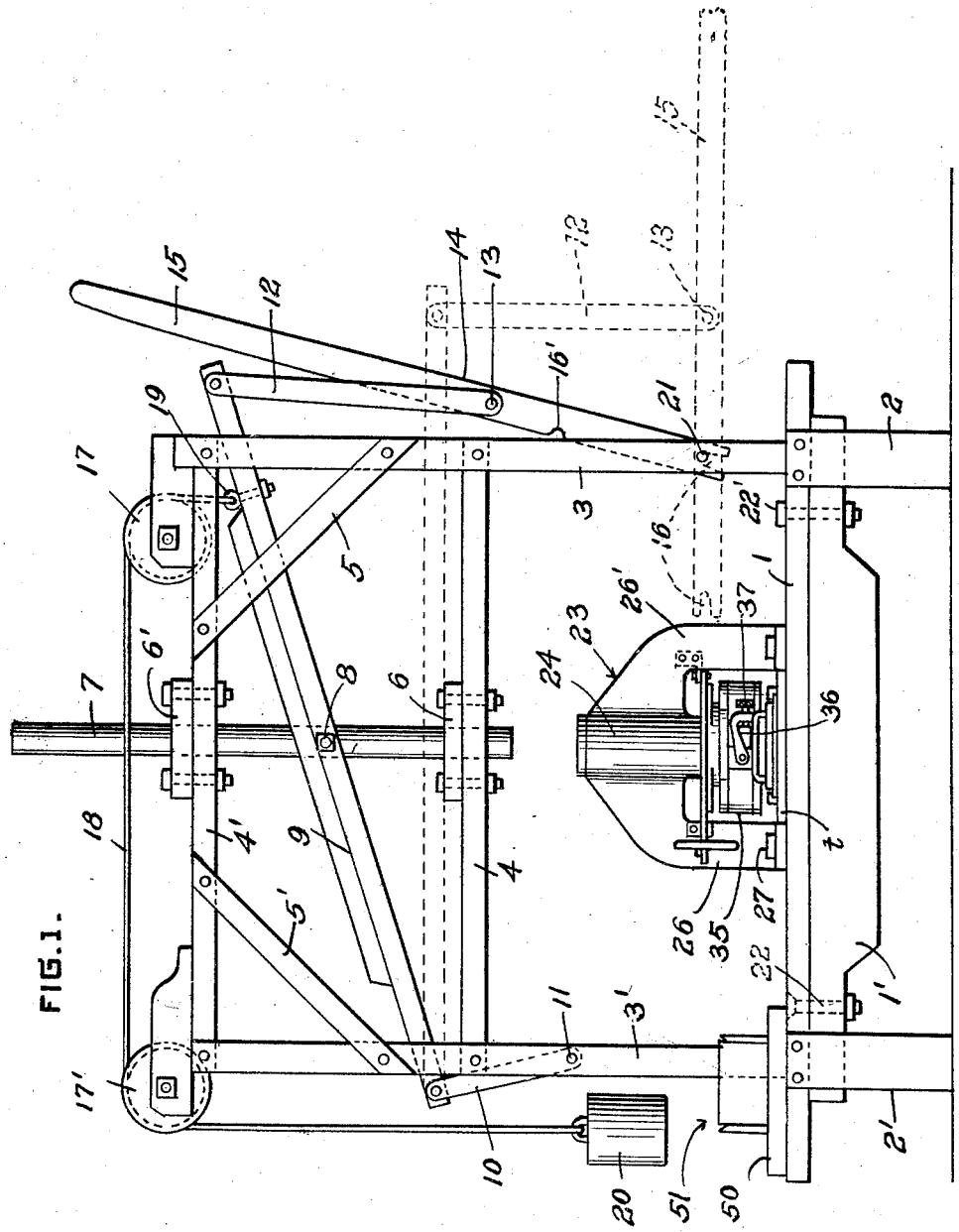

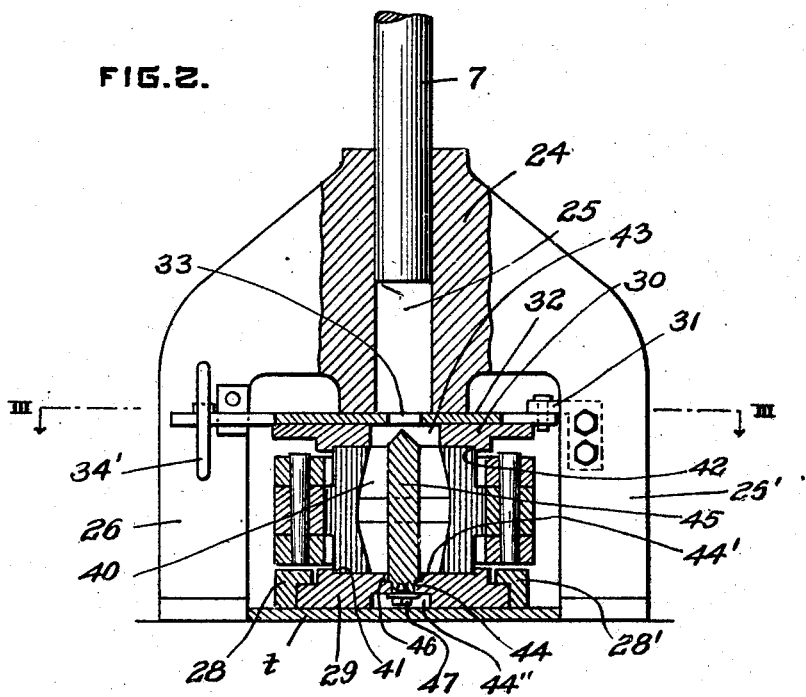
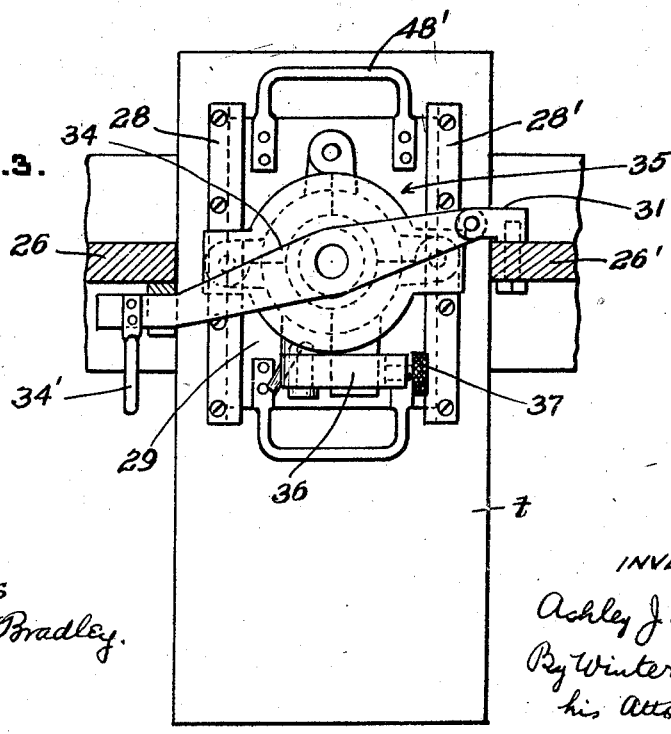

April 28, 1925.

A. J. GULICH 1,535,410

REFRACTORY SHAPE PRESS AND MOLD THEREFOR

Filed March 20, 1924     4 Sheets-Sheet 4

WITNESSES

INVENTOR
Ashley J. Gulich,
By Winter & Brown
his Attorneys

Patented Apr. 28, 1925.

1,535,410

UNITED STATES PATENT OFFICE.

ASHLEY J. GULICH, OF CLEARFIELD, PENNSYLVANIA, ASSIGNOR TO HARBISON-WALKER REFRACTORIES COMPANY, OF PITTSBURGH, PENNSYLVANIA, A CORPORATION OF PENNSYLVANIA.

REFRACTORY-SHAPE PRESS AND MOLD THEREFOR.

Application filed March 20, 1924. Serial No. 700,614.

*To all whom it may concern:*

Be it known that I, ASHLEY J. GULICH, a citizen of the United States, and a resident of Clearfield, in the county of Clearfield and State of Pennsylvania, have invented a new and useful Improvement in Refractory-Shape Presses and Molds Therefor, of which the following is a specification.

This invention relates to molding apparatus, and particularly to a molding machine for forming hollow nozzles from plastic clay.

It is an object of the invention to provide a molding apparatus which is simple but sturdy in construction, economical to build, which will not easily get out of order, and which is highly efficient in operation.

It is a special object to provide a molding apparatus which can be normally actuated with ease, and which is adapted to be readily manipulated to obtain an increased pressure upon its extrusion plunger during the final stage in the formation of the nozzle.

It is also a special object to provide an apparatus of the character referred to comprising a receptacle for containing the plastic material, a mold for shaping the nozzle, and a trimming device, in which the trimming element is adapted to function both as a bottom for the receptacle and a filler block between the receptacle and mold during the injection of the plastic material into the mold as well as a means for severing the material between the receptacle and mold after the formation of the nozzle.

Another special object is to provide a molding apparatus having a convenient, simple and effective mold adapted to cooperate with the remaining portions not only during the injection of the plastic material into the mold but which permits the ready removal of the formed nozzle from the mold.

These and other objects of the invention will more fully appear when taken in conjunction with the following description and the appended claims.

Figure 8:
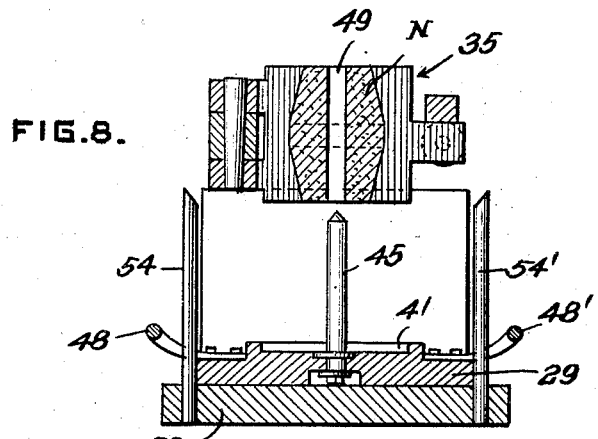
Figure 9:
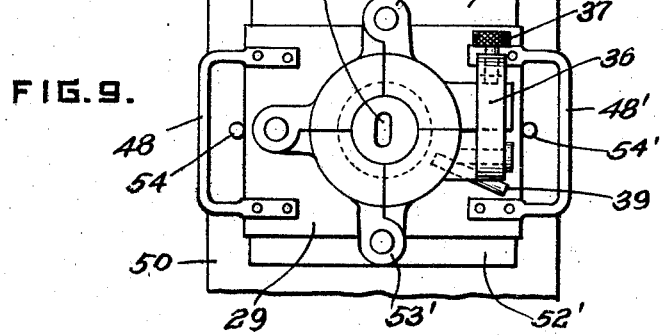
Figure 10:
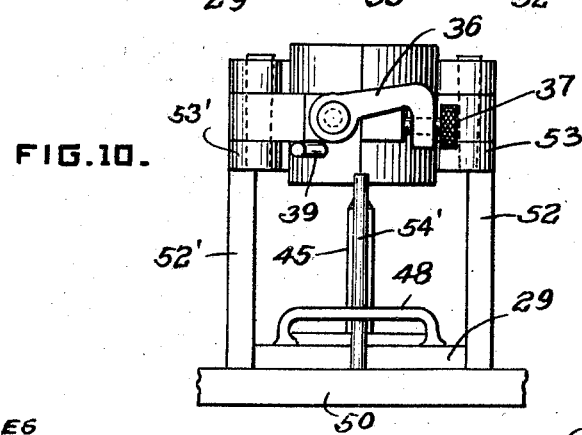

In the accompanying drawings Fig. 1 is an elevational view showing the entire apparatus with the mold in operative position to receive a charge of material for the formation of the nozzle; Fig. 2 a fragmentary view, partly in elevation and partly in section, taken through the receptacle for containing the plastic material and the mold, the parts being in the relative position shown in Fig. 1, with the exception that the plunger has partially entered the receptacle; Fig. 3 a horizontal sectional view taken substantially on the line III—III of Fig. 2; Fig. 4 a plan view of the sectional mold employed, showing the method of connecting the several sections, and with the mold in a partially open condition for the removal of the nozzle; Fig. 5 a side elevation showing the parts illustrated in Fig. 4; Fig. 6 a perspective view of one type of nozzle adapted to be formed by the molding apparatus comprising this invention; Fig. 7 a view similar to Fig. 6 of a modified form of nozzle; Fig. 8 a fragmentary view illustrating the guide box and the cooperation of the mold therewith for removing the bottom plate of the mold; Fig. 9 is a plan view of the parts illustrated in Fig. 8; and Fig. 10 an elevational view of the parts shown in Figs. 8 and 9.

The apparatus comprising this invention consists of a bed plate 1 mounted upon suitable supporting legs 2, 2', carrying a framework in which to mount the reciprocating plunger for injecting the plastic material into the mold, and the actuating means for the plunger. The framework includes a plurality of standards 3, 3', the transverse beams 4, 4', together with strengthening braces such as indicated at 5, 5'. Ordinarily there are four upright standards disposed adjacent the four corners of the bed plate, and the transverse beams 4, 4' are disposed therebetween, in the fashion shown in Fig. 1 of the drawings.

A guide collar 6 is attached to the transverse beam 4 about midway of its length, and a similar collar 6' is likewise fixed to the intermediate portion of the transverse beam 4'. A vertically reciprocating plunger 7 is mounted in the guiding collars 6, 6', and has operatively connected thereto, as by pivoting at the point 8, a swinging bar 9, one end of which is pivotally connected to a link 10 hingedly mounted to the framework at the point 11. The opposite end of the bar 9 is pivotally connected to a depending link 12 the lower extremity of which is in turn pivotally connected at 13 to a freely suspended actuating lever 14, one end of the lever being in the form of an actuating handle 15, while its opposite end, that nearer the framework, is equipped with a plurality of notches 16, 16', the notch 16 being formed by bifurcating the extremity of the lever while the notch 16' is formed by hollowing out a portion of the upper edge of the lever at a point located a short distance from its pivot 13.

The transverse beam 4' has mounted thereon a pair of sheaves 17, 17', about which is twined a cable 18, one end of the cable being anchored to the swinging bar 9, as at 19, while suspended from the free end thereof is a counterweight 20. The counterweight 20 functions in an obvious manner to suspend the swinging bar 9 and the plunger 7, together with the link 12 and actuating lever 14, and is sufficiently heavy to constantly tend to urge the plunger upwardly into the position shown by the full lines in Fig. 1 of the drawings. Located at one side of the framework and extending between the corner uprights 3 is a transverse pivotal abutment stop 21 adapted to be engaged either by the notch 16 or the notch 16', as desired by the operator, and for a purpose to be subsequently described.

The bed plate rests directly upon a strengthening brace 1' extending the full length of the framework, and is attached thereto preferably by means of bolts indicated at 22, 22'. The bed plate 1 has mounted thereon about midway of its length a receptacle 23 for containing the plastic material used, and is provided at its central portion with a cylindrical part 24 having the bore 25, and with the oppositely directed legs 26, 26', which rest upon the upper surface of the bed plate and are preferably attached thereto by means of bolts 27 or other suitable fastening devices. The cylindrical portion 24 is open at both its upper and lower ends, with the bore 25 extending completely therethrough, and the said cylindrical portion terminates at a considerable distance above the upper surface of the bed plate, and in order to permit the plunger 7 to enter the bore 25 is disposed in vertical alignment therewith.

Also mounted upon the upper surface of a table $t$ fixed to the bed plate is a pair of spaced guide ribs 28, 28' located within the space between the legs 26, 26'. These guide ribs are adapted to engage the bottom plate 29 of the mold in which the nozzle is formed, the top plate of the mold being indicated at 30. Hingedly mounted to a lug 31 on the leg 26 is a trimming element 32 which is adapted to be swung so as to lie immediately below the lower end of the bore 25, and is provided with an aperture 33 which is adapted to lie in alignment with the bore 25 when the trimming element is moved to the position shown in Figs. 2 and 3. The trimmer 32 is provided with a knife edge 34 at one side thereof, and carries a hand grip 34' at its extremity opposite its pivotal support so as to enable the operator to readily actuate the same.

The mold comprises the bottom plate 29, the top plate 30, and a body portion 35, which includes a plurality of segmental sections $35^a$, $35^b$, $35^c$ and $35^d$. All of these sections are hingedly connected to each other, except the end sections $35^a$ and $35^d$, which are free to be separated in the manner indicated in Figs. 4 and 5, or to be brought into abutting relation as indicated in the remaining figures of the drawings. In order to selectively release the end sections of the mold and lock them into abutting relation, the section $35^d$ has pivotally mounted thereon the latch 36, the extremity 36' of which is bent angularly and equipped with a binding screw 37. The section $35^a$ has formed thereon the radially extending lug 38 which is adapted to be engaged by the bent end of the latch and held in fixed relation therewith by the screw 37, in an obvious manner. The parts in locked condition are clearly shown in Fig. 10 of the drawings. In order to limit the swinging movement of the latch when the same is moved to its released condition a limiting pin 39 is provided on the section $35^d$.

When the mold is in a position in which the sections $35^a$ and $35^d$ are brought into abutting relation, the body of the mold assumes an annular form having a hollow central recess 40 extending throughout the entire height thereof, and the inner wall formed by the several sections bounding this hollow recess conform in outline to the external surface of the nozzle to be made. As illustrated in Figs. 2, 8 and 5, the recess within the mold gradually tapers from both its upper and lower ends towards an intermediate section which is cylindrical in form. With such a mold, a nozzle N corresponding in external contour to that shown in Fig. 6 will be formed. It is obvious, however, that the contour of the recess 40 may be changed in many respects without departing from the spirit of the invention in order to form nozzles of various shapes. For instance, the intermediate cylindrical portion may be entirely omitted, thus forming a nozzle N' such as indicated in Fig. 7.

The upper surface of the bottom plate 29 is provided with a shallow depression 41 which is adapted to receive the lower extremity of the mold when in closed condition, and likewise the top plate 30 is provided with a shallow depression 42 cooperating with the upper end of the mold in a similar fashion. The upper plate is also provided with a central aperture 43 which preferably corresponds in size to that of the upper extremity of the recess 40 and is adapted to form a continuation thereof when the parts are in assembled relation with each other. The bottom plate 29 also has a central aperture 44 extending therethrough which is enlarged at its opposite extremities as at 44' and 44". An upstanding block or post 45 is anchored in this opening and projects upwardly through the hollow recess 40, as clearly shown in Fig. 2. The post 45 is provided with a flanged base 46 adjacent its lower end, which fits within the enlargement 44', the upper surface of the flange 46 lying flush with the upper surface of the bottom plate 29. The enlargement 44" serves as a housing for the bolt 47 which threads into the body of the block at its lower extremity for binding it into fixed relation with the bottom plate. In order to facilitate handling of the plate 29, and to enable the entire mold in its assembled relation to be carried from place to place by the operator with ease, the ends of the plate have attached thereto the hand grips 48, 48'. The cross sectional shape of the post 45 corresponds to the shape of the opening 49 extending through the nozzle, that shown in the drawings being elliptical.

Extending laterally from the bed plate 1, and carried thereby at the left hand side, as viewed in Fig. 1, is a table or bench 50, and mounted upon this table is a guide box indicated generally at 51 for use in removing the body of the core from the bottom plate of the mold after the formation of the nozzle. This guide box comprises the upstanding portions 52, 52' which are separated a sufficient distance to receive the bottom plate 29 therebetween, while retaining the body of the mold in suspended position due to the radially extending hinged portions 53, 53' of the mold contacting with the upper edges of the members 52, 52', in the manner clearly shown in Figs. 8 to 10 of the drawings.

The bench 50 also carries a pair of upstanding pins 54, 54', which are located slightly beyond and intermediate the members 52, 52', the distance between these pins being slightly greater than the length of the bottom plate 29, so that when the bottom plate of the mold is forced downwardly between the members 52, 52' and the pins 54, 54' the same will be effectively guided in a substantially vertical line.

The operation of the apparatus is as follows:—The body of the mold is first adjusted with the sections 35ᵃ and 35ᵈ in abutting relation, and the mold locked in this position. The body of the mold is then placed upon the bottom plate 29 so as to seat within the shallow depression 41, and the top plate 30 placed upon the top of the body so that its upper portion will engage with the depression 42. The mold thus assembled, is placed upon the bed plate 1 immediately below and in alignment with the receptacle 24. Such positioning is facilitated by the engagement of the edges of the bottom plate 29 with the guide ribs 28, 28', after which it is merely necessary to slide the bottom plate to the desired position.

The trimming element 32 is then swung so as to lie beneath the receptacle 24, as shown in Fig. 2 of the drawings, and in this position not only forms a closure plate for the bottom of the receptacle, but also bridges the space between the receptacle and the top plate 30.

The plunger 7 being held in its uppermost position by means of the counterweight 20, as shown in Fig. 1, a charge of plastic material is then placed within the bore 25, the notch 16 engaged with the pivotal abutment 21, and the handle 15 depressed so as to force the plunger 7 downwardly within the bore. Pressure upon the plunger 7 causes it to descend and force the plastic material through the aperture 33 into the hollow recess 40 of the mold. The mold is first completely filled in this manner, after which the notch 16 is disengaged from the pivotal abutment 21 and the notch 16' engaged therewith. Further downward pressure upon the handle 15 compresses the plastic material within the mold to a greater degree due to the increased leverage obtained.

After the mold is completely filled and compressed in this manner, the plunger 7 is permitted to rise, and the trimming element 32 is swung back and forth so as to completely sever the material between the mold and the receptacle, this trimming action being facilitated by means of the knife edge 34.

The entire mold is then removed by sliding the bottom plate 29 along the table t and out of engagement with the guiding ribs 28, 28' in an obvious fashion. After the top plate 30 has been removed from the mold, the material surrounding the upper edge of the post 45 above the upper limits of the body of the mold is trimmed off in any suitable manner. The remaining portions of the mold are then bodily placed over the guide box 51, with the portions 53 and 53' of the mold resting upon the upper edges of the members 52 and 52', and with the bottom plate 29 surrounded by the members 52, 52' and the pins 54, 54', in a manner previously noted. Downward pressure upon the handles 48, 48' causes the bottom plate of the mold to be moved downwardly into the position shown in Fig. 8 of the drawings, consequently effectively withdrawing post 45, and leaving the formed nozzle within the body of the mold.

The latch 36 is then released and the several sections of the mold body gradually withdrawn from the exterior surface of the nozzle in a manner readily apparent from an inspection of Figs. 4 and 5 of the drawings.

It is thus seen that the invention provides a simple, sturdy and efficient molding apparatus for forming hollow nozzles from plastic materials, one in which the plastic material may be readily forced into the mold and conveniently compressed by means of a manually actuated handle, one in which the receptacle for the plastic material, the trimming mechanism and the mold, all cooperate in a novel and efficient manner, one in which the trimming mechanism not only serves its primary purpose but also functions as a closure plate for the bottom of the receptacle and as a bridging member between the receptacle and the mold, and one in which the finished article may be conveniently removed from the mold without danger of injury after the formation of the nozzle.

I claim:

1. A molding apparatus comprising a stationary receptacle for containing plastic material and having its opposite ends freely open, a swinging trimmer provided with an aperture therethrough, said trimmer being adapted to be moved to a position whereby to form a closure plate for one end of the receptacle, a removable mold adapted to be disposed in alignment with the receptacle and the aperture in the trimmer, a plunger for forcing material from the receptacle into the mold, and means for actuating the plunger.

2. A molding apparatus comprising a bed plate, a supporting framework, a receptacle for containing plastic material fixed to the bed plate, a movable mold adapted to rest upon the bed plate in alignment with the receptacle, a plunger mounted for reciprocation in the framework cooperating with the receptacle to force the plastic material into the mold, a swinging bar pivotally mounted at the one end of the framework and operatively engaging the plunger, a link carried by the opposite end of the bar, and an actuating lever freely suspended bodily from said link.

3. A molding apparatus comprising a bed plate, a supporting framework, a receptacle for containing plastic material fixed to the bed plate, a removable mold adapted to rest upon the bed plate in alignment with the receptacle, a plunger mounted for reciprocation in the framework cooperating with the receptacle to force the plastic material to the mold, a swinging bar pivotally mounted at the one end to the framework and operatively engaging the plunger, a link carried by the opposite end of the bar, an actuating lever freely suspended intermediate its ends from the said link, the end of the lever adjacent the framework being provided with a plurality of notches, and a pivotal abutment stop on the framework adapted to be selectively engaged by the said notches.

4. A mold for forming nozzles comprising a bottom plate, a top plate, and a hollow body including a plurality of pivotally connected sections, the upper surface of said bottom plate being provided with a depression for snugly receiving the ends of the sections whereby to position the body and hold the sections in abutting relation.

5. A mold for forming nozzles comprising a bottom plate, a top plate, and a hollow body including a plurality of pivotally connected sections, the top and bottom plates being provided with recesses for snugly receiving the opposite ends of said sections whereby to position the body and hold the sections in abutting relation.

6. A mold for forming nozzles comprising a bottom plate, a top plate and an annular hollow body including a plurality of segmental sections, all but two of said sections being pivotally connected to each other, means for selectively locking the remaining sections into intimate contact or releasing the same, the bottom plate being provided with a depression for receiving the lower end of said body.

7. A mold for forming nozzles comprising a bottom plate, a top plate, and a hollow body including a plurality of pivotally connected sections, the upper surface of said bottom plate being provided with a depression for receiving the end of the body, and a post fixed to the bottom plate extending upwardly through the hollow body.

8. A mold for forming nozzles comprising a bottom plate, a top plate, and a hollow body including a plurality of pivotally connected sections, the top and bottom plates being provided with recesses for receiving the opposite ends of said body, both said plates having apertures in alignment with the recess of the hollow body, and a post anchored in the aperture of the bottom plate extending upwardly through the hollow body.

9. A mold for forming nozzles comprising a bottom plate, a top plate, and a hollow body including a plurality of pivotally connected sections, the top and bottom plates being provided with recesses for receiving the opposite ends of said body, both said plates having apertures in alignment with the recess of the hollow body, the extremities of the aperture in the bottom plate being enlarged, a post anchored in the aperture of the bottom plate extending upwardly through the hollow body, said post having a flanged base fitting the enlargement of the aperture adjacent the upper face of the plate and lying flush therewith, and a screw bolt housed within the enlargement adjacent the lower face of the plate and engaging the post for locking it in fixed position.

In testimony whereof, I sign my name.

ASHLEY J. GULICH.